United States Patent [19]
Lee

[11] Patent Number: 6,088,166
[45] Date of Patent: Jul. 11, 2000

[54] MINIATURIZATION OF GRADIENT INDEX LENS USED IN OPTICAL COMPONENTS

[75] Inventor: Ho-Shang Lee, El Sobrante, Calif.

[73] Assignee: Dicon Fiberoptics, Inc., Berkeley, Calif.

[21] Appl. No.: 09/218,438

[22] Filed: Dec. 22, 1998

[51] Int. Cl.[7] .................................................. G02B 3/00
[52] U.S. Cl. .......................................... 359/654; 359/652
[58] Field of Search ..................................... 359/652–654

[56] References Cited

U.S. PATENT DOCUMENTS

| | | | |
|---|---|---|---|
| 3,729,253 | 4/1973 | Moore et al. .............................. | 359/652 |
| 3,827,785 | 8/1974 | Matsushita et al. ..................... | 359/654 |
| 3,859,103 | 1/1975 | Yoshiyagawa et al. ................. | 359/654 |
| 3,873,408 | 3/1975 | Hensler . | |
| 3,941,474 | 3/1976 | Kitano et al. ............................ | 385/124 |
| 4,674,843 | 6/1987 | Baba et al. ............................... | 359/654 |
| 4,799,761 | 1/1989 | Yamamoto et al. ..................... | 359/654 |
| 4,982,222 | 1/1991 | Rees ......................................... | 359/652 |
| 5,076,672 | 12/1991 | Tsuda et al. ............................ | 359/244 |
| 5,093,719 | 3/1992 | Prescott .................................... | 359/652 |
| 5,108,167 | 4/1992 | Kandpal et al. .......................... | 385/33 |
| 5,182,672 | 1/1993 | Mukai et al. ............................ | 359/652 |
| 5,253,323 | 10/1993 | Koike et al. ............................ | 359/654 |
| 5,287,222 | 2/1994 | Uozu et al. .............................. | 359/654 |
| 5,349,473 | 9/1994 | Kurasawa et al. ....................... | 359/654 |
| 5,361,166 | 11/1994 | Atkinson et al. ........................ | 359/654 |
| 5,390,274 | 2/1995 | Toyoda et al. ........................... | 359/654 |
| 5,396,366 | 3/1995 | Brown et al. ............................ | 359/652 |
| 5,450,157 | 9/1995 | Rees ......................................... | 359/652 |
| 5,457,576 | 10/1995 | Atkinson et al. ........................ | 359/654 |
| 5,568,320 | 10/1996 | Rees et al. ............................... | 359/652 |
| 5,607,492 | 3/1997 | Doric ....................................... | 359/654 |
| 5,638,214 | 6/1997 | Doric ....................................... | 359/654 |
| 5,644,122 | 7/1997 | Siegenthaler et al. .................. | 359/652 |
| 5,657,155 | 8/1997 | Cheng ...................................... | 359/341 |
| 5,680,237 | 10/1997 | Cheng ...................................... | 359/131 |
| 5,790,314 | 8/1998 | Duck et al. .............................. | 359/654 |
| 5,815,624 | 9/1998 | Rosenberg ............................... | 385/33 |
| 5,870,229 | 2/1999 | Tsuchida ................................. | 359/654 |
| 5,917,626 | 6/1999 | Lee .......................................... | 359/131 |

OTHER PUBLICATIONS

"High index gradient in glass by ion exchange," J.L. Coutaz et al., pp. 207–209, reprinted with permission from *Applied Optics*, vol. 21(6), pp. 1063–1065, Mar. 15, 1982.

"Electrostatic–comb Drive of Lateral Polysilicon Resonators," William C. Tang et al., pp. 194–197, reprinted with permission from *Transducers '89, Proceedings of the 5th International Conference on Solid–State Sensors and Actuators and Eurosensors III*, vol. 2, pp. 328–331, Jun. 1990.

"A Light–Focusing Fiber Guide Prepared by Ion–Exchange Techniques," Ichiro Kitano et al., pp. 195–202, reprinted with permission from *Journal of the Japan Society of Applied Physics*, Supplement to vol. 39, pp. 63–70, 1970.

"Electrostatically Balanced Comb Drive For Controlled Levitation," William C. Tang et al., pp. 198–202, reprinted from *Technical Digest IEEE Solid–State Sensor and Actuator Workshop*, pp. 23–27, Jun. 1990.

"Laterally Driven Polysilicon Resonant Microstructures," William C. Tang et al., pp. 187–193, reprinted from *Proceedings IEEE Micro Electro Mechanical Systems*, pp. 53–59, Feb. 1989.

*Primary Examiner*—Georgia Epps
*Assistant Examiner*—Evelyn A. Lester
*Attorney, Agent, or Firm*—Majestic, Parsons, Siebert & Hsue P.C.

[57] ABSTRACT

GRIN lenses are made by an ion/exchange process. In order to make a GRIN lens whose gradient index varies slowly radially, a cylindrical glass rod of a sufficiently large diameter is immersed in a salty bath. The size of the lens may be reduced by grinding, polishing or chemically etching away a peripheral optically dispensable portion of the lens away from the axis of the lens so that the outer diameter of the lens is as small as 0.8 millimeters. When such a smaller lens is used in optical components such as circulators, switches, WDM's and isolators, such optical devices would also be reduced in size to fit within a limited space.

14 Claims, 1 Drawing Sheet

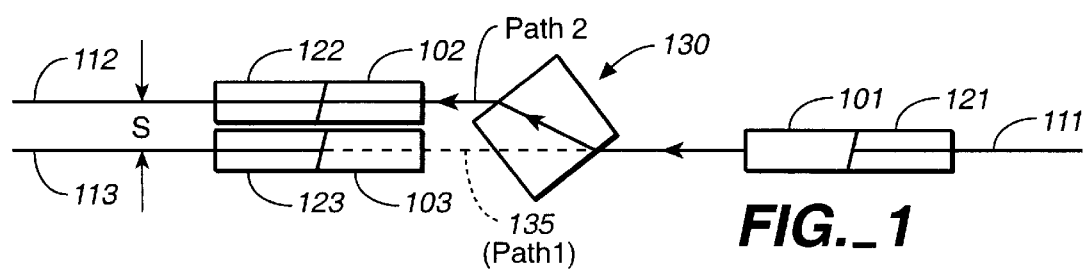
FIG._1
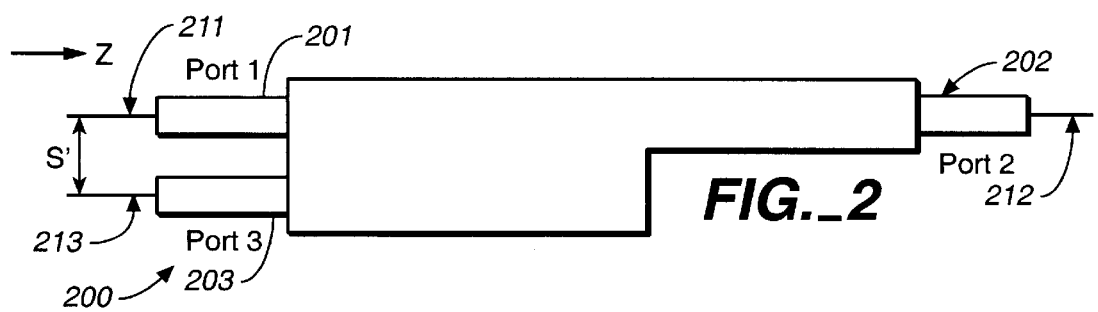
FIG._2
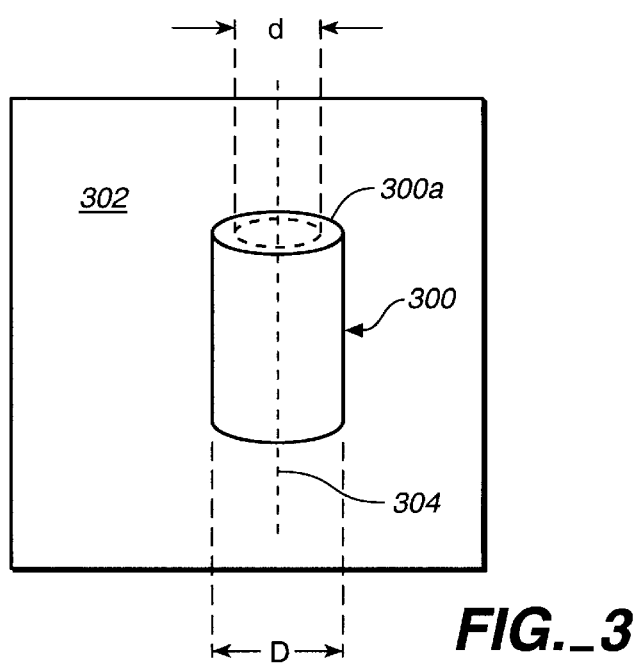
FIG._3

MINIATURIZATION OF GRADIENT INDEX LENS USED IN OPTICAL COMPONENTS

BACKGROUND OF THE INVENTION

This invention relates to a gradient index (GRIN) lens, instruments using such lenses, and method for making such lens.

In recent years, optical fiber technology for telecommunication has progressed rapidly to replace other means for telecommunication such as copper wires and microwave. In many telecommunication applications, it is important for the devices used to be small enough to fit into a limited space. GRIN lenses are widely used in fiber optic components such as switches, isolators, wavelength division multiplexers (WDM's), and circulators. However, as explained below, it is desirable for the index of refraction of a GRIN lens to vary gradually from the axis of the lens radially towards its periphery. In order to make such lens, a glass rod of sufficient diameter is usually employed, so that the resulting lens having adequate optical performance is larger than a certain size. The size of the lenses is often one of the limiting factors of component size. It is therefore desirable to reduce the size of GRIN lenses and still preserve its optical performance.

SUMMARY OP THE INVENTION

In order to reduce the size of fiberoptic components such as switches, isolators, WDM's and circulators, the Applicant proposes a GRIN lens having an axis and dimensions in a plane perpendicular to its axis not more than about 1.2 millimeters. The lens has a gradient constant with respect to the axis in the range of about 0.30 to 0.36. When such a GRIN lens is used in an optical instrument such as a switch, isolator, WDM's and circulator, the size of such instrument is significantly reduced so that the instrument is small enough to fit within a limited space.

BRIEF DESCRIPTION OF THE DRAWINGS

FIG. 1 is a schematic view of a 1×2 optical switch to illustrate the invention.

FIG. 2 is a schematic view of an optical circulator to illustrate the invention.

FIG. 3 is a schematic view of a salty bath into which a cylindrical glass rod is inserted to illustrate the process for making a GRIN lens to illustrate the invention.

DETAILED DESCRIPTION OF THE PREFERRED EMBODIMENT

FIG. 1 is a 1×2 switch 100, which is used to illustrate the advantages of small GRIN lenses in reducing component size. GRIN lens 101–103 are used as collimators as appended to fibers 111–113, respectively. The fiber ends of fibers 111–113 are encapsulated in three ferrules, 121–123, respectively.

The optical beam emerging from collimator 101 enters the collimator 103 as indicated by a dash-line 135 (Path 1) if no optical element intervenes the optical path of the beam. As an optical element such as prism 130 is dropped into the optical path, the optical beam is relayed to another collimator 102 (Path 2). The beam displacement S between two paths 1 and 2 in fibers 112, 113 has to be greater than two times of the radius of GRIN lens 102, 103. The size of the prism needed to produce sufficient beam displacement to switch the beam between paths 1 and 2 is linearly proportional to S. The size of the prism is one of limiting dimensional factors. The smaller the diameter the GRIN lens, the smaller is the beam displacement is and therefore also the size of the prism. A smaller prism reduces the overall size of the switch 100.

Other components incorporating adjacent GRIN lenses can also be reduced in size for the same reasons as explained in the above example. This is illustrated, for example, in FIG. 2. FIG. 2 is a schematic view of an optical circulator used to illustrate the advantages of small GRIN lenses on reducing component size. As shown in FIG. 2, circulator 200 includes GRIN lenses 201–203. An optical beam carried by fiber 211 is collimated by lens 201 at port 1 and transmitted by the circulator to port 2. At port 2, the light beam enters GRIN lens 202 serving as a collimator for collimating the beam to fiber 212. An input light beam carried by fiber 212 is collimated by GRIN lens 202 through the circulator to port 3, where the light beam enters collimator or GRIN lens 203 to fiber 213. Again, the size of circulator 200 is partially determined by the distance S between fibers 212 and 213, which, in turn, is determined by the diameters or radii of the GRIN lenses 201 and 203. By reducing the diameters of the lenses 201, 203, the size of the circulator 200 would be also reduced. In a similar manner, the size of other optical instruments or components such as isolators and WDM's are also dependent upon the size of the GRIN lenses used in such devices.

The GRIN lens is a cylindrical glass th radially gradient distribution of index of refraction and cylindrically symmetrical with respect to the center axis. The index of refraction is highest in the center of the lens and decreases with radial distance from the axis to the lowest value at the periphery or outer circumference of the lens. The radial distribution of index of refraction is achieved by ion exchange between big ions in the glass rod and small ions in a salty bath. The ion-exchange process takes a few tens of hours to a few hundreds of hours depending on the rod diameter and temperature. The most important characteristic constant of the GRIN lens is the gradient constant, $\sqrt{A}$, as defined in the Catalog of NSG America, Inc, Somerset, N.J. Ion exchange is a diffusion process. By nature the larger the diameter of GRIN lens, the smaller is the gradient constant $\sqrt{A}$ and the better is its optical performance. To ensure good optical performance, slowly radially varying index of refraction is necessary so that a sufficiently large diameter glass rod is normally placed in a salty bath to make a GRIN lens. GRIN lenses of 1.8 mm diameter of Model SLW-180 from NSG is widely used because of its excellent optical performance although smaller diameter lens is desirable for applications such as telecommunications.

Where a GRIN lens is used with a single mode fiber for collimating or transferring an optical beam, only the portion of the lens that is within a diameter of 300–500 microns around the GRIN lens axis substantially carries optical power. The rest of material outside this 300–500 micron diameter does not participate significantly in the optical transmission. It is an objective of the present invention to trim the optically inert area from a GRIN Lens. The trimming can be done by mechanical grinding or polishing or by chemical etching. The grinding can be done to precise outer diameter by means of a Centerless Grinding System provided by Unison Co. of Ferndale, Mich. The trimming by chemical etching can be done by dipping the glass rod into acid such as hydrofluoric acid and controlling the amount of time it is immersed. An outer diameter for the GRIN lens as small as 0.8 mm is desirable for a number of optical component designs.

FIG. 3 is a schematic view of a salty bath and a cylindrical glass rod in the bath to illustrate the process for making a small GRIN lens according to the invention. As shown in FIG. 3, the cylindrical glass rod 300 is immersed in a salty bath 302, where the rod has an axis 304 as shown in FIG. 3. Rod 300 has a sufficiently large diameter, such as a diameter D of 1.8 millimeters or more. With such diameter, the refractive index varies slowly in the radial direction from axis 304. With a diameter of 1.8 millimeters or more, the ion-exchange process causes rod 300 to have a gradient constant preferably in the range of about 0.30 to 0.36, resulting in a GRIN lens having excellent optical performance.

However, as noted above, while a large diameter cylindrical rod may be used to accomplish a gradual change in the gradient index in the lens, the resulting lens is typically too large and causes optical devices incorporating such lenses to be too large to fit into a limited space required for telecommunications applications. According to the invention, a peripheral portion such as portion 300a, comprising the outer cylinder of the rod may be removed by grinding, polishing or chemical etching, so that the resulting GRIN lens has a smaller diameter d. Such processes are described above. In the preferred embodiments, the grinding, polishing or chemical etching is performed so that the diameter d of the resulting GRIN lens is no more than 1.2 millimeters. As noted above, since only the center core of the lens of about 300 to 500 micron diameter around axis 304 is used to carry optical power in optical applications, removal of the peripheral portion 300a does not affect significantly the operation of the lens.

The resulting smaller GRIN lens may then be used in optical devices such as switch 100, circulator 200, WDM's and isolators or still other optical components so that the resulting optical device is also reduced in size and may fit within limited space. This is particularly useful for telecommunication applications.

While a diameter d of 1.2 millimeters may be adequate for some optical components, a GRIN lens having a diameter d of 1 millimeter or 0.8 millimeters may be desired for other optical component designs.

While the invention has been described above by reference to various embodiments, it will be understood that changes and modifications may be made without departing from the scope of the invention, which is to be defined only by the appended claims and their equivalents.

What is claimed is:

1. A GRIN lens comprising a body of glass material, said body having an axis and dimensions in a plane perpendicular to said axis, said dimensions being not more than about 1.2 mm, said body having a gradient constant with respect to said axis in a range of about 0.30 to 0.36.

2. The lens of claim 1, wherein said dimensions of the lens in said plane is about 1.0 mm.

3. The lens of claim 1, wherein said dimensions of the lens in said plane is about 0.8 mm.

4. A method for making a GRIN lens comprising:
providing a body of electromagnetic radiation transmissive material, said body having an axis and dimensions in a plane perpendicular to said axis, said dimensions being more than about 1.2 mm;
causing ion exchange between said body and a medium so that the body has a gradient constant with respect to said axis in a range of about 0.30 to 0.36; and
removing material from a peripheral portion of said body so that said dimensions in said plane of said body are not more than about 1.2 mm.

5. The method of claim 4, wherein said removing includes etching said material from the peripheral portion of the body.

6. The method of claim 4, wherein said removing includes polishing the peripheral portion of the body.

7. The method of claim 4, wherein said removing includes removing material from the peripheral portion of the body until said dimensions are about 0.8 mm.

8. An optical instrument, comprising:
an array of two or more first GRIN lenses for transmitting electromagnetic radiation;
one or more second GRIN lens for transmitting electromagnetic radiation; and
means for controlling transfer of electromagnetic radiation between said first and second GRIN lenses, wherein at least one of the first GRIN lenses comprises a body of glass material, said body having an axis and dimensions in a plane perpendicular to said axis, said dimensions being not more than about 1.2 mm, said lens having a gradient constant with respect to said axis in a range of about 0.30 to 0.36.

9. The instrument of claim 8, wherein said dimensions of at least one of the first GRIN lenses in said plane is about 1.0 mm.

10. The instrument of claim 8, wherein said dimensions of at least one of the first GRIN lenses in said plane is about 0.8 mm.

11. The instrument of claim 8, wherein said controlling means controls the switching of electromagnetic radiation between said first and second GRIN lenses, said instrument being an optical switch.

12. The instrument of claim 8, wherein said controlling means controls the transfer of electromagnetic radiation from a first lens of the array to one of second GRIN lens and from one of the second GRIN lenses to a second lens of the array, said instrument being an optical circulator.

13. The lens of claim 1, wherein said body has undergone an ion exchange process so that said body has a gradient constant with respect to said axis in a range of about 0.30 to 0.36.

14. The lens of claim 8, wherein said body has undergone an ion exchange process so that said body has a gradient constant with respect to said axis in a range of about 0.30 to 0.36.

* * * * *